United States Patent [19]

Yardley et al.

[11] Patent Number: 5,191,528
[45] Date of Patent: Mar. 2, 1993

[54] UPDATE MARKER SYSTEM FOR NAVIAGTION OF AN AUTOMATIC GUIDED VEHICLE

[75] Inventors: James V. Yardley, Centerville; Gary L. Whatcott, Holladay; Bryan A. Bloomfield, Bountiful, all of Utah

[73] Assignee: Eaton-Kenway, Inc., Salt Lake City, Utah

[21] Appl. No.: 602,609

[22] Filed: Oct. 24, 1990

Related U.S. Application Data

[63] Continuation-in-part of Ser. No. 545,174, Jun. 28, 1990, abandoned.

[51] Int. Cl.⁵ .................. G05D 1/03; G06F 15/50
[52] U.S. Cl. .................. 364/424.02; 180/168; 180/169; 318/587
[58] Field of Search .............. 364/424.02, 449, 571.04, 364/577, 474.31; 180/167, 168, 169; 318/580, 587

[56] References Cited

U.S. PATENT DOCUMENTS

| | | | |
|---|---|---|---|
| 3,172,496 | 3/1965 | Rabinow et al. | 180/79 |
| 3,638,751 | 2/1972 | Moll et al. | 180/318 |
| 4,613,804 | 9/1986 | Swenson | 318/587 |
| 4,622,644 | 11/1986 | Hanson | 364/571.04 X |
| 4,658,928 | 4/1987 | Seo | 180/168 |
| 4,714,124 | 12/1987 | Laib | 180/168 |
| 4,777,601 | 10/1988 | Boegli | 364/424.02 |
| 4,817,750 | 4/1989 | Ishida et al. | 180/168 |
| 4,847,774 | 7/1989 | Tomikawa et al. | 364/449 |
| 4,908,557 | 3/1990 | Sudare et al. | 318/587 |
| 4,955,447 | 9/1990 | Hashimoto et al. | 180/168 |
| 4,990,841 | 2/1991 | Elder | 318/587 |

FOREIGN PATENT DOCUMENTS 0049697 4/1982 European Pat. Off. .
59-135514 3/1984 Japan .

OTHER PUBLICATIONS

European Patent Application-Kabushiki Kaisha Komatsu Guiding Apparatus for Unmanned Movable Bodies-0 273 976 May 21, 1987.

*Primary Examiner*—Parshotam S. Lall
*Assistant Examiner*—Collin W. Park
*Attorney, Agent, or Firm*—Lynn G. Foster

[57] ABSTRACT

An improved accuracy position and direction updating system for use with an automatic guided vehicle that navigates by dead reckoning. Permanent magnets providing detectable position indicators are mounted in the floor and may be at widely spaced locations such as fifty feet apart along the route of the vehicle. A row of Hall sensors is transversely mounted on the vehicle. The sensors detect the lateral location of each floor magnet relative to the vehicle as the vehicle passes over the magnet. Sensors are precalibrated, correcting for errors in sensor null voltage readings due to changes in sensor characteristics due to causes comprising aging and temperature. Data from five sensors that are closest to the magnet are correlated with a stored pattern of magnetic field and their position data are averaged to determined a first estimate of the lateral or first dimensional position of the vehicle. A running average is calculated from sequentially acquired estimates to improve the results. Such precalibration and averaging provides an improved accuracy of the lateral or first dimensional position measurement between the array of Hall sensors and the magnet. A high frequency measurement of the time at which the signals from the row of sensors reaches a peak value, which is the time that the row of sensors arrives at the magnet, provides an improved second dimensional position measurement. More than one magnet is read concurrently to provide position and bearing information during one processing cycle.

15 Claims, 12 Drawing Sheets

UPDATE MARKER SYSTEM FOR NAVIAGTION OF AN AUTOMATIC GUIDED VEHICLE

CONTINUITY

This application is a continuation-in-part of our co-pending U.S. patent application Ser. No. 07/545,174 filed Jun. 28, 1990, abandoned.

FIELD

The field of the invention is automatic guidance of trackless vehicles, particularly vehicles that navigate by dead reckoning and without a driver on board.

SUMMARY

The invention is an inexpensive flexible way of providing benchmarks of improved accuracy for updating the position of a vehicle that is navigated primarily by dead reckoning. The distance traveled is measured by rotation of wheels on the vehicle and the direction by gyroscopic navigation methods, which are susceptible to error and drift. Accumulated errors in position and direction are corrected by having the vehicle detect the relative location of each successive magnetic marker over which it passes on the floor.

One object of the invention is to provide apparatus for measuring, with improved accuracy, the position of a vehicle relative to a known marker at the floor to ascertain the vehicle's position relative to a factory reference system.

Another object is to utilize a generally transverse array of sensors on the vehicle to sense the marker and to process the sensed data regarding marker position in a particular way to determine the relative position of the vehicle with improved accuracy.

Another object is to determine marker-vehicle relative position by taking readings with a plurality of sensors, including the sensor having the greatest reading, the two sensors immediately on one side of it, and the two sensors immediately on the other side of it, and correlating and interpolating the readings with a stored spatial pattern of magnetic field strength whereby a measurement of improved accuracy is realized.

Another object is to ascertain the longitudinal position of the vehicle by means of the marker by sensing the occurrence of maximum readings of the sensors as the vehicle passes over the marker.

Another object is to utilize the generally transverse array of sensors to concurrently sense two closely positioned markers having predetermined relative and factory reference locations and, thereby, provide concurrent measurements for ascertaining the attitude of the array of sensors, associated bearing of the vehicle in addition to determination of lateral and longitudinal vehicle position.

BRIEF DESCRIPTION OF THE FIGURES

FIGS. 9, 9A, and 9B comprise a simplified flow chart of an algorithm for processing sensor data to concurrently measure the lateral position of the vehicle relative to two magnets and to detect when the row of Hall sensors crosses each magnet.

DESCRIPTION OF PREFERRED EMBODIMENT

Vehicle

Figure 1:
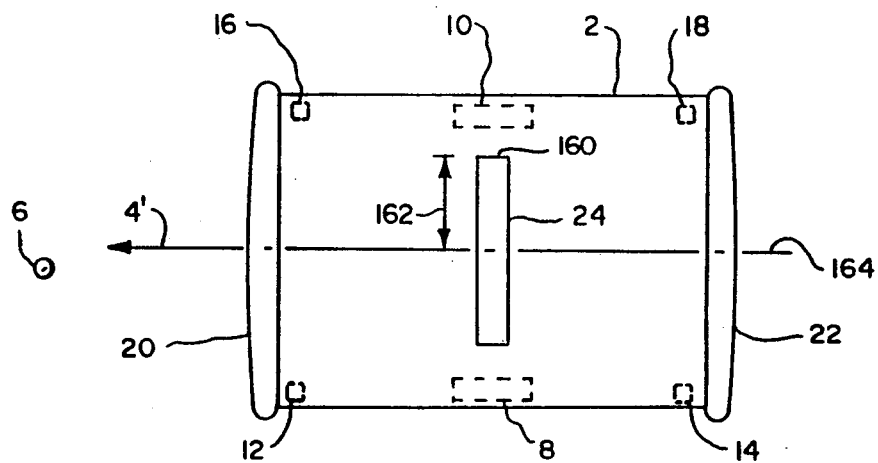
FIG. 1 depicts a guided vehicle system that utilizes the invention.

FIG. 1 is a stylized top view of a guided vehicle 2 driving in the direction of the arrow 4 toward a magnet 6 that is mounted in the floor. The vehicle 2 has drive wheels 8, 10 on the left and right sides respectively, which are powered individually by motors that are not shown. Caster 12, 14, 16 and 18 support the vehicle at its left-front, left-rear, right-front and right-rear corners respectively. The terms left, right, front and back are used here for convenience of description; the vehicle operates symmetrically in either direction.

Touch-sensitive feelers or bumpers 20, 22 are located at the front and back of the vehicle respectively to detect obstacles in the path and to activate switches to stop the vehicle. A transversely arranged linear array of magnetic sensors 24 is mounted on the vehicle as shown in FIG. 1.

Floor magnet

Figure 2:
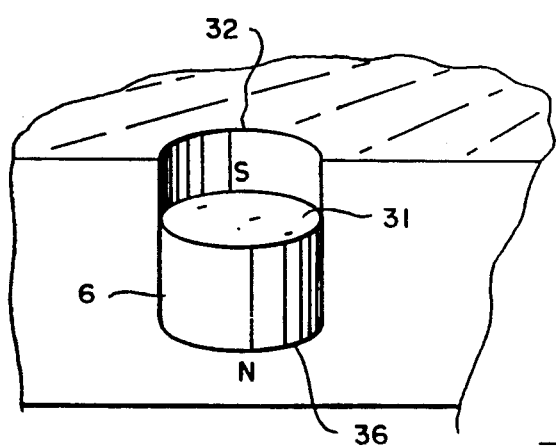
FIG. 2 shows an update marker magnet in the floor.

In FIG. 2 a floor magnet 6 is shown in place in a hole 32 in the floor. The magnet in this embodiment is cylindrical, placed with its axis vertical, and has its south-polarized face 34 facing upward and its north-polarized face 36 at the bottom of the hole. The diameter of the magnet in this embodiment is 1 inch and its axial height is ¾ inch.

Magnetic-Field Sensors

Figure 3:
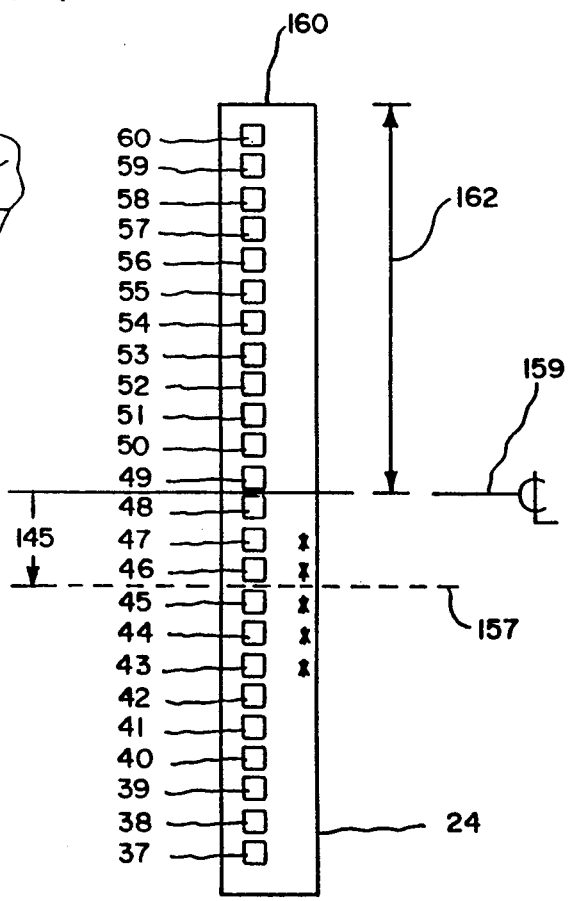
FIG. 3 shows an array of Hall magnetic sensors on the vehicle.

The array 24 of magnetic-field sensors in shown in plan view in FIG. 3. In this embodiment it comprises twenty-four Hall-effect sensors spaced for example 0.8 inch apart in a straight line perpendicular to the longitudinal centerline of the vehicle and laterally centered on the centerline of the vehicle. The first sensor is labeled 37; the twelfth sensor is 48; the thirteenth sensor is 49 and the twenty-fourth sensor is 60.

The sensors are commercially available devices whose analog output voltage varies as a function of the magnetic field it detects. Each sensor has a null voltage, which is its output when no magnetic field is present. When a magnetic field is present the voltage consistently increases or decreases relative to the center of flux of the magnet and to the null voltage, depending upon whether the magnet crosses a south or north pole. In the described embodiment of the invention the sensors always detect a south pole field 34, so their output voltage always increases as a result of being near a magnet.

Figure 4:
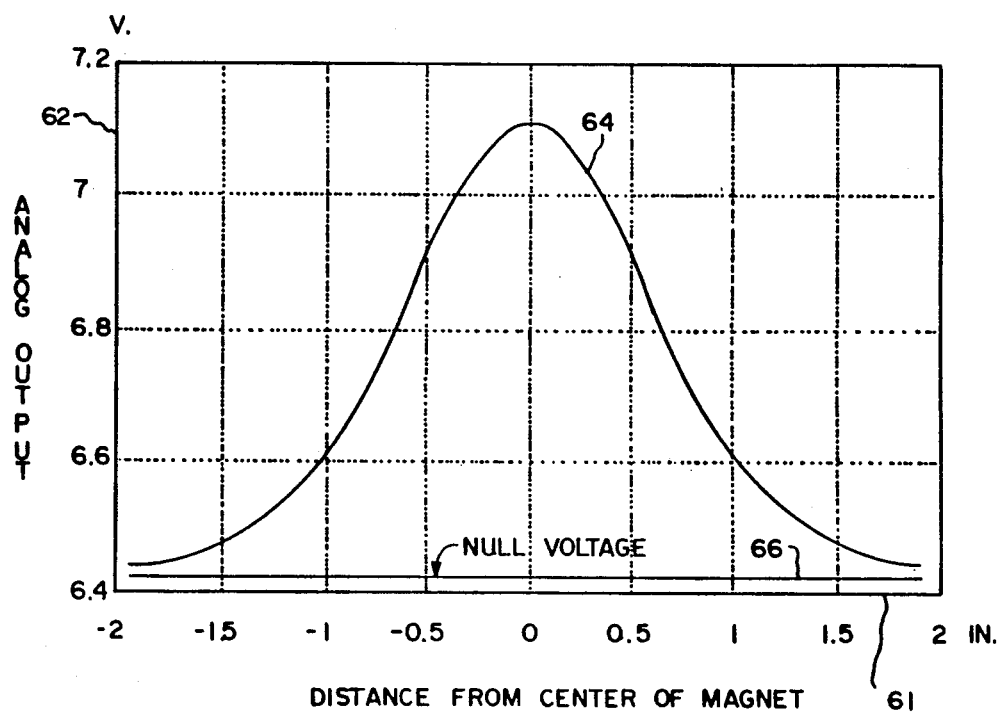
FIG. 4 is a curve of analog voltage output from one of the Hall sensors as a function of distance of the sensor from a floor magnet.

A representative graph 64 of the analog output voltage versus distance of a sensor from the center of the magnet 6 is shown in FIG. 4. Voltage output from the Hall sensor (such as sensor 45, for example) is shown on the ordinate 62, in volts. The distance from the center of the magnet to the sensor is shown on the abscissa 61 in inches. For the measurement shown, the graph has a depressed zero and the output voltage in the absence of any magnetic field is the null voltage 66 of about 6.44 volts.

In this measurement, when the sensor 45 is directly over the center of the magnet the analog output voltage is approximately 7.1 volts. When the sensor 45 is approximately one inch away from the center of the magnet 6 the analog output voltage 64 produced by the sensor is approximately 6.65 volts. Thus, two magnets which are more than four inches apart, but sufficiently close to be simultaneously sensed, produce detectable signals which are essentially independent.

Circuits for Processing Sensor Signals

Figure 5:
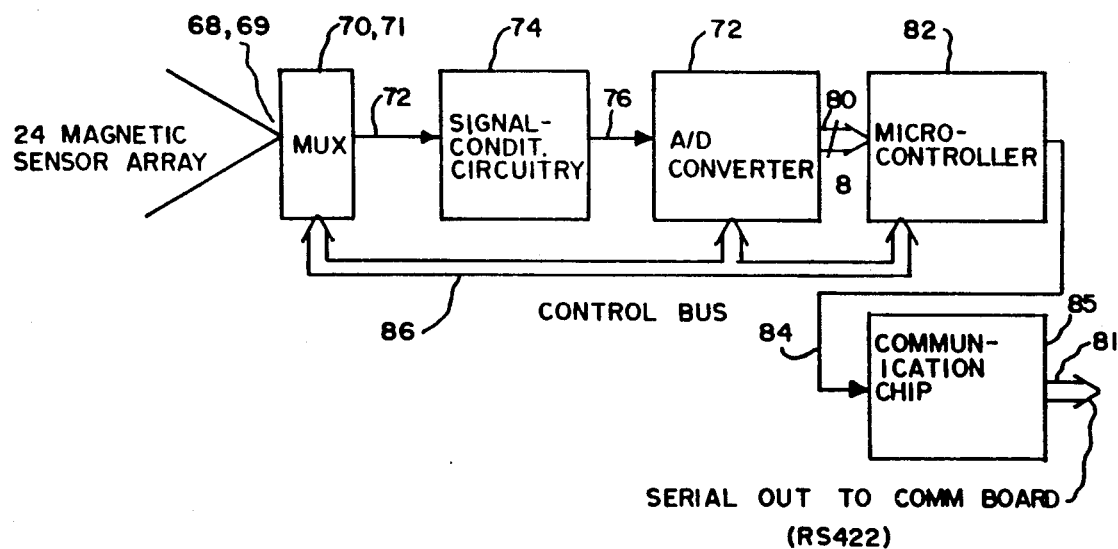
FIG. 5 is a block diagram of some electronic equipment on the vehicle for processing magnet sensor signals.

Signals from the twenty-four Hall sensors of array 24 are input at terminals 68, 69 to a pair of ganged multiplexers 70, 71, as shown in FIG. 5. The multiplexers 70, 71 receive analog signals continuously from the twenty-four sensors 37–60, and select one at a time sequentially for output at line 72. The two output signals from the multiplexers are connected to a signal-conditioning circuit 74 whose functions are explained in more detail below. Its output at line 76 is connected to an analog-to-digital converter (A/D) 78 whose output comprises eight digital lines 80 that conduct digital signals to a microcontroller 82.

Output data from the microcontroller 82 are in serial form differential output at a line 84, which conducts the data through a communication chip 85 and differential output lines 87, therefrom, to a communication board, not shown. A control bus 86 enables the microcontroller 82 to control multiplexers 70, 71 and the A/D converter 78 as described more fully below.

Circuit Details

Figure 6:
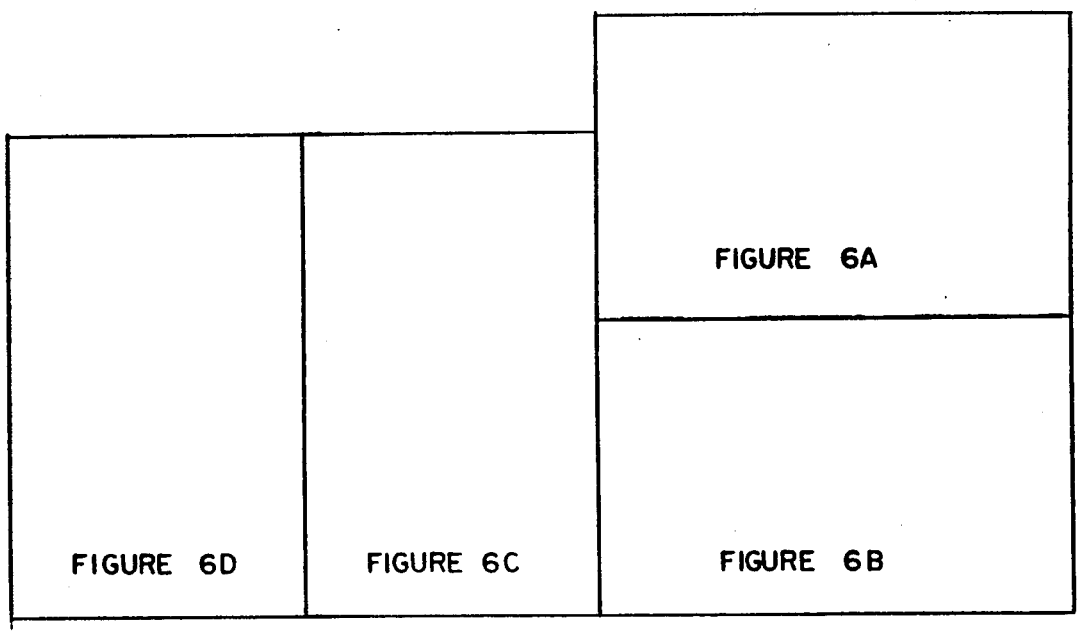
FIGS. 6, 6A, 6B, 6C, and 6D are, in combination, a schematic diagram of the same electronic equipment.

More details of the electronic circuits on the vehicle are shown in FIGS. 6 and 6A–D. In combination, FIGS. 6A–D comprise a single circuit layout, numbered in clockwise rotation and divided as seen in FIG. 6. Interconnections among FIGS. 6A–D comprise twenty-four lines between FIGS. 6A and 6B, six lines between FIGS. 6B and 6C, and four lines between 6C and 6d. The lines between 6A and 6B comprise twenty four sensor inputs 68,69. Interconnections between 6B and 6C comprise five lines, generally designated 114, and line 16. Lines 84, 84', 114' and 631' connect components of FIGS. 6C and 6D.

The twenty-four sensor inputs 68, 69 are connected to two sequentially addressed multiplexers which may be Model AD7506 multiplexers. Outputs 72, 73 are each connected through a series resistor 91 to an inverting input 93 of amplifier 95. Output of amplifier 95 is conducted through a series resistor 90 to an inverting input 92 of a difference amplifier 94. A non-inverting input 96 of the difference amplifier 94 is provided with a fixed reference voltage from a regulated DC voltage source 98 and an inverting amplifier 100, which are conventional circuits.

The output 104 of the difference amplifier 94 is connected to the analog input terminal of an analog-to-digital converter 78. The circuits involving subcircuits 94, 95, 98, and 100 are represented by the signal-conditioning circuit block 74 of FIG. 5.

The A/D converter 78 is a commercially available semiconductor device and may be model No. AD678 marketed by Analog Devices company of Norwood, Mass. It converts the analog signals that it receives on line 76 to 8-bit digital data at its eight output lines 80. Those lines 80 conduct the digital signal to input terminals of the microcontroller 82.

The microcontroller 82 may be of the type Intel 8051, 8751, etc. The one used in this embodiment is a Model DS5000, which is available from Dallas Semiconductor company of Dallas, Tex., and which is the same as Intel 8751 except with more internal RAM. A crystal 110 and two capacitors 112 are connected to a terminal of microprocessor 82 to determine the clock frequency of the microprocessor. Five lines generally indicated as 114 are connected from outputs of the microcontroller 82 to inputs of multiplexers 70, 71 to enable the microcontroller to step multiplexers 70, 71, through the twenty-four sensor inputs sequentially by addressing them one at a time. Output lines 84 from the microprocessor lead to a communications chip 85 and therefrom to a communication board related to a main microcontroller. Communications chip 85 may be a Motorola-manufactured and marketed MC3487.

The following table is a list of component types and values, as used in the circuit of FIGS. 6A-D.

| Reference | Type | Device number/value |
| --- | --- | --- |
| C1 | Capacitor | 1.0 microfarads |
| C2 | Capacitor | 1.0 microfarads |
| C3 | Capacitor | 1.0 microfarads |
| C8 | Capacitor | 0.1 microfarads |
| C9 | Capacitor | 33 picofarads |
| C10 | Capacitor | 33 picofarads |
| C11 | Capacitor | 0.1 microfarads |
| C12 | Capacitor | 1.96 microfarads |
| C13 | Capacitor | 0.1 microfarads |
| C14 | Capacitor | 0.1 microfarads |
| CR1 | Diode | 1N914 |
| CR2 | Diode | HLMP6500 |
| Q1 | Transistor | 2N2222 |
| R1, R2 | Resistor | 100K Ohms |
| R3 | Resistor | 150K Ohms |
| R4 | Resistor | 100K Ohms |
| R5 | Resistor | 1.69K Ohms |
| R6 | Resistor | 2.21K Ohms |
| R7 | Resistor | 4.7K Ohms |
| R8, 9 | Resistor | .2K Ohms |
| R10 | Resistor | 100K Ohms |
| R11, 12 | Resistor | 18K Ohms |
| R13, 14 | Resistor | 2.2K Ohms |
| R15, 16, 17 | Resistor | 100K Ohms |
| R18 | Resistor | 150K Ohms |
| R19 | Resistor | 4.3K Ohms |
| R20 | Resistor | 450 Ohms |
| E1–24 | Hall Sensor | 91S312 |
| U1, U9 | Multiplexer | AD7506 |
| U2 | Difference Amplifier | LF347 |
| U3 | Communications Chip | MC3486 |
| U4 | Microcontroller | D5500032 |
| U5 | A/D Converter | AD670KN |
| U6 | Logic Circuit | 74LS132 |
| U7 | Communications Chip | MC3487 |
| U8 | DC Regulator | LM317LZ |

| Reference | Type | Device number/value |
|---|---|---|
| Y1 | Crystal | 12MHZ |

Data Processing

Figure 9:
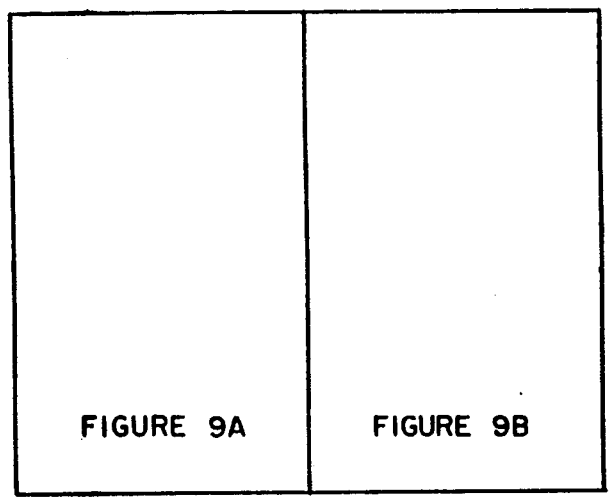
Figure 6A:
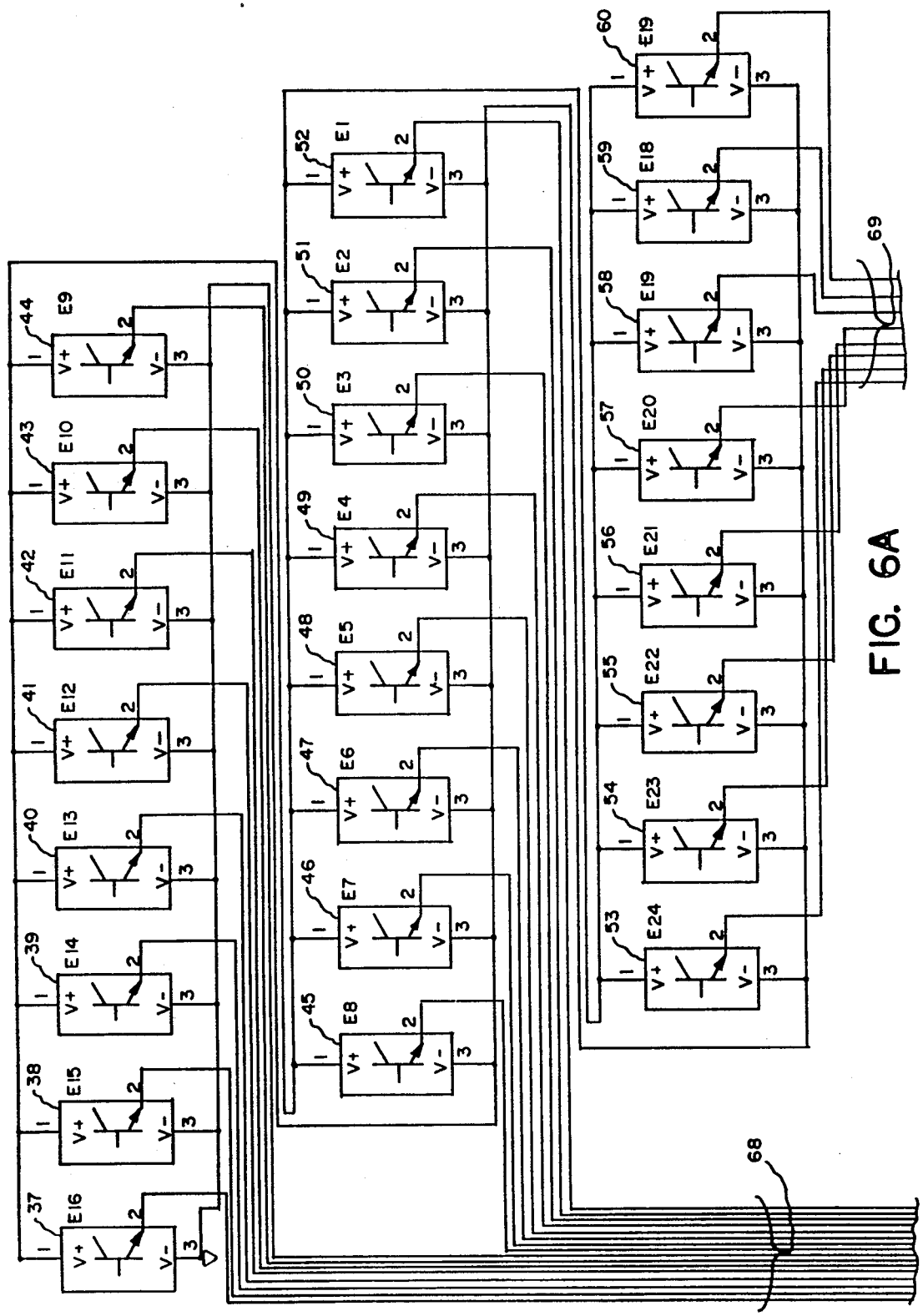
Figure 6B:
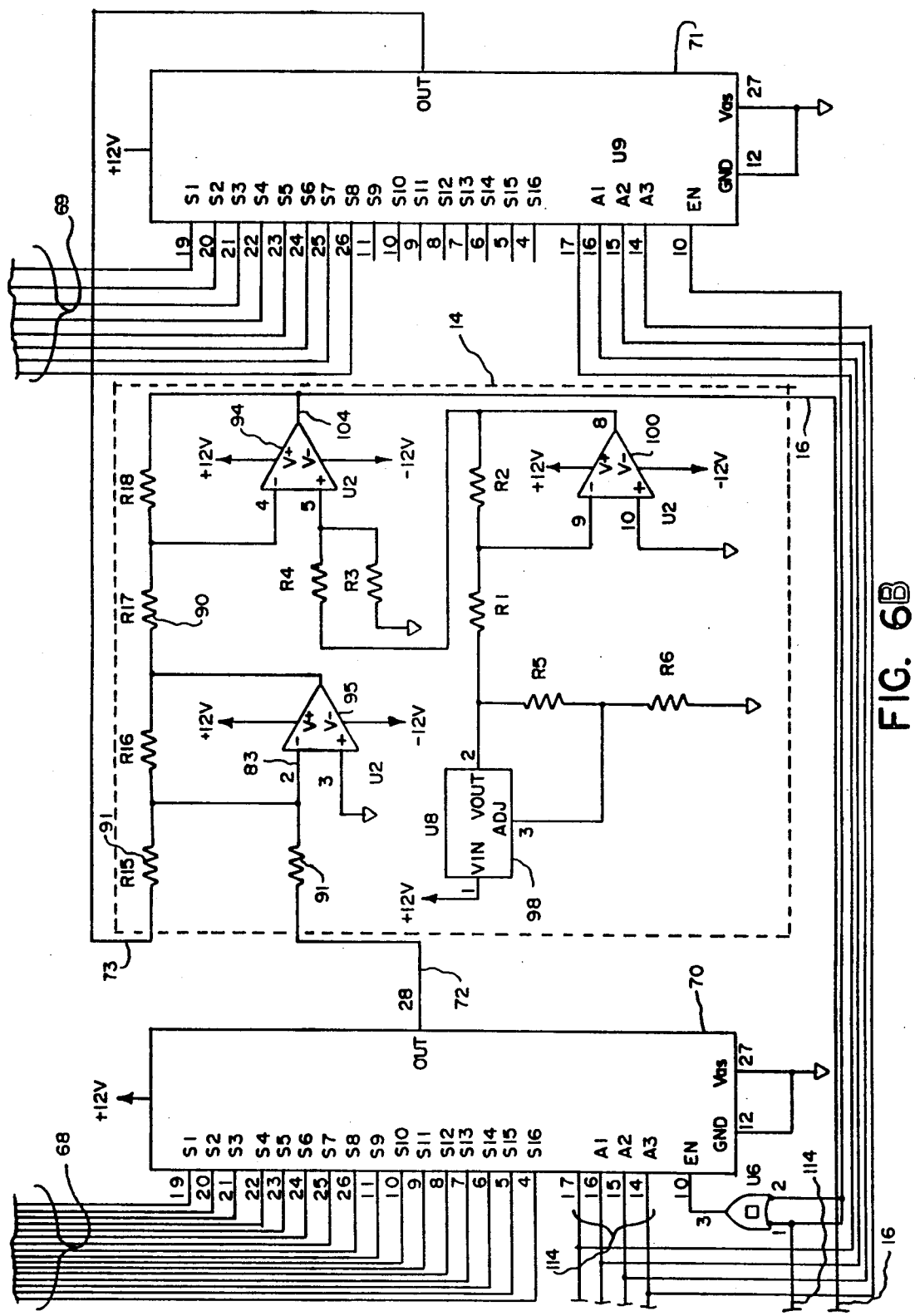
Figure 6C:
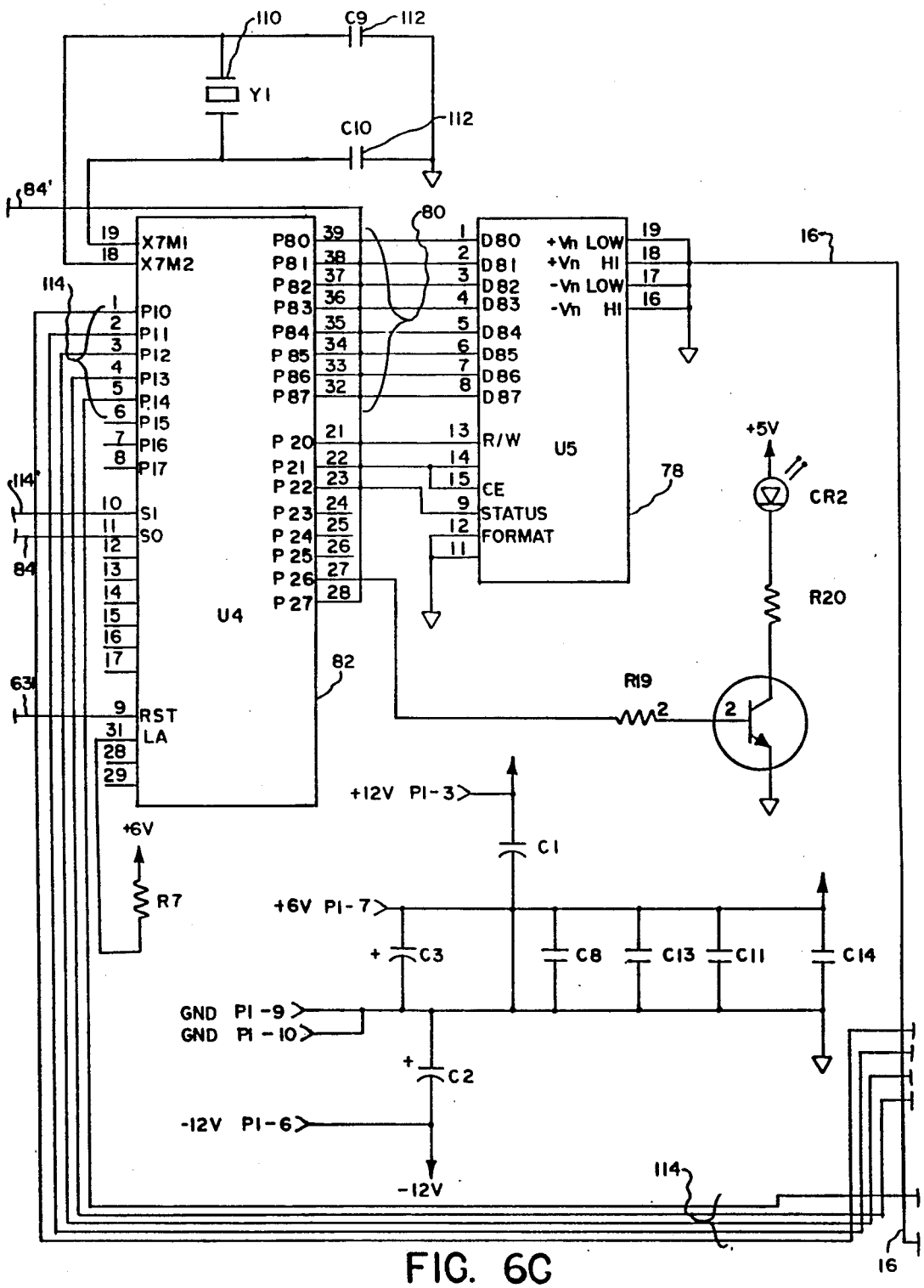
Figure 6D:
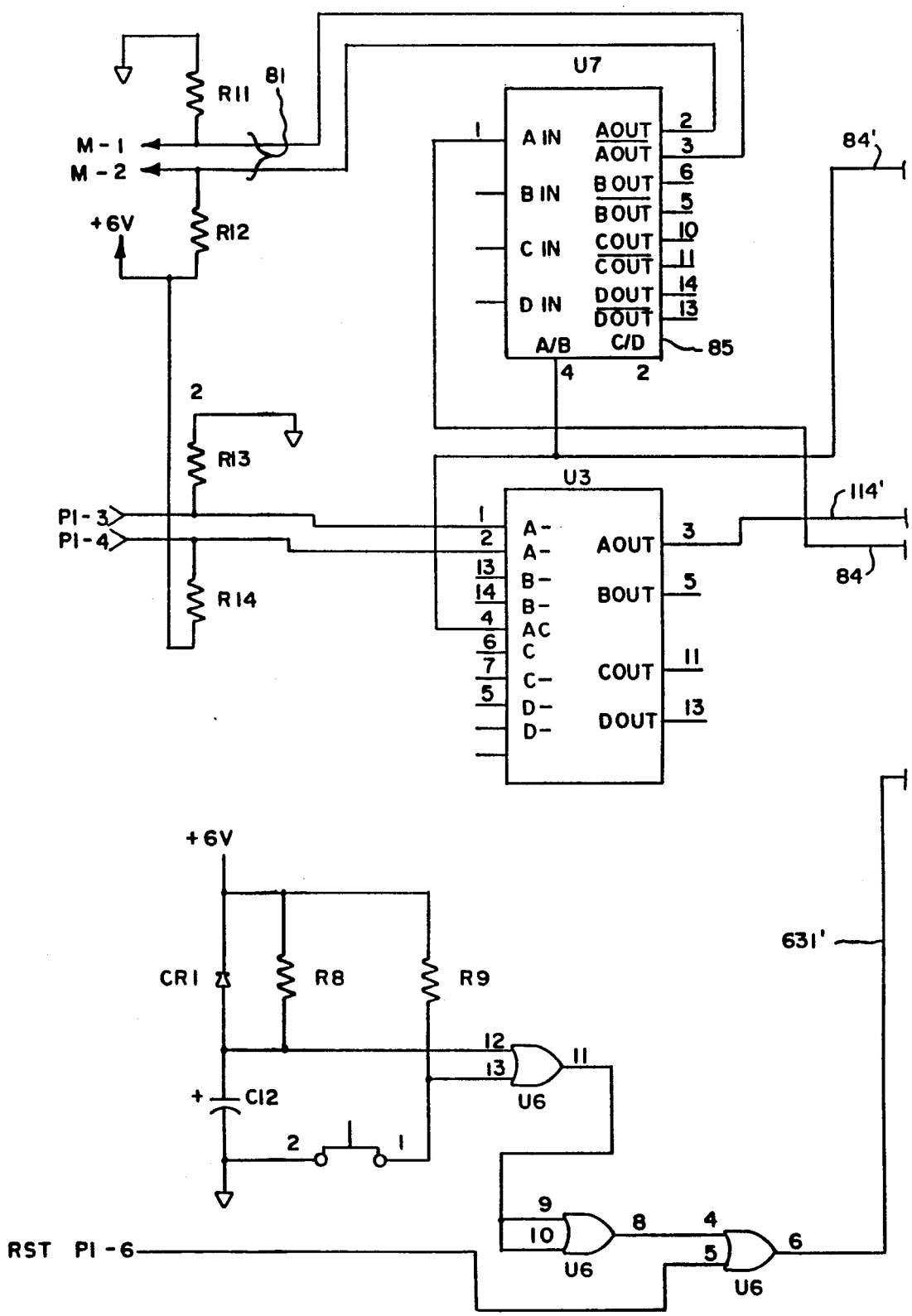
Figure 7:
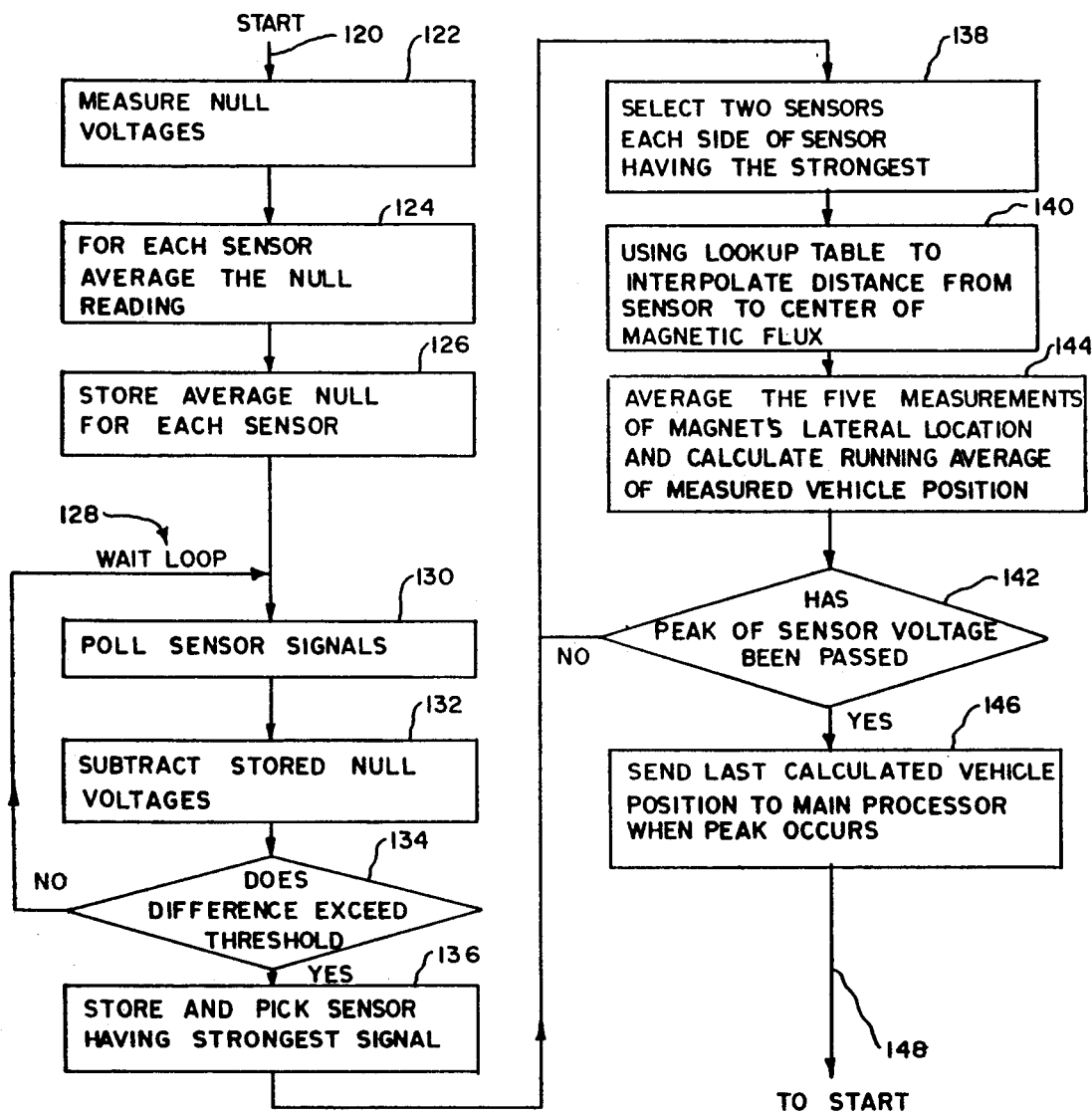
FIG. 7 is a simplified flow chart of an algorithm for processing sensor data to measure the lateral position of the vehicle relative to a magnet and to detect when a row of Hall sensors crosses the magnet.
Figure 8:
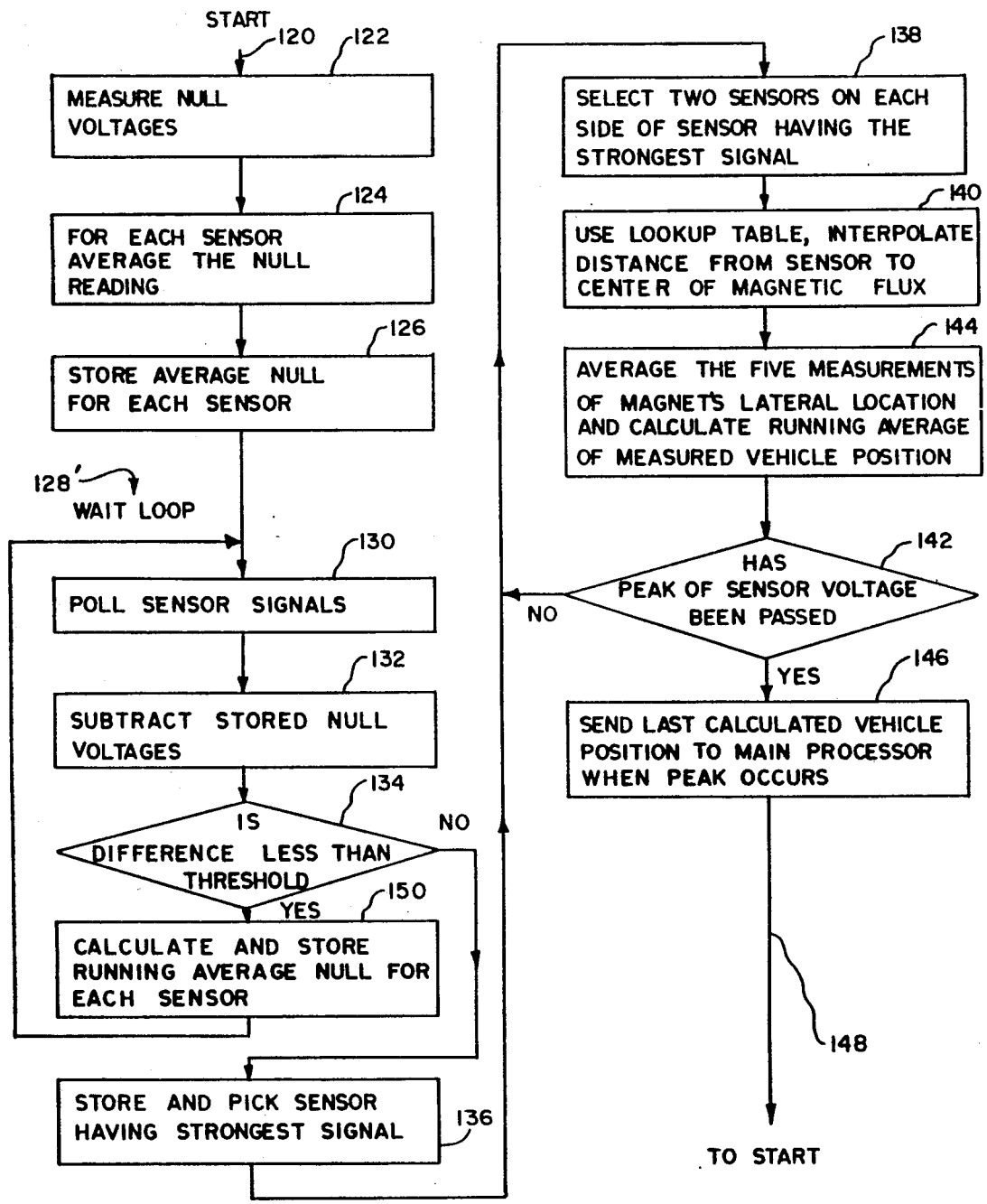
FIG. 8 is a simplified flow chart similar to FIG. 7 including sensor null measurement and related calibration during the WAIT LOOP.

A simplified algorithm is shown in the flow chart of FIG. 7 to explain how the microprocessor 82 determines the lateral and longitudinal positions of floor-mounted magnet 6 as the array of Hall sensors 24 passes generally over the magnet 6. Programming techniques for accomplishing the specified steps, seen in FIG. 7 and also in FIGS. 8 and 9, are known in the computer art.

Initializing and Updating of the Null Voltages

When the update marker system is activated the null voltage of each sensor 37–60 is measured by multiplexing the outputs of the sensors one at a time. The respective null signals of each of the sensors are measured several times, added together and divided to obtain an average value. Averaging is necessary to reduce the effects of errors in measurements of the null voltages. Each sensor has a different average null voltage; an average is computed for each sensor alone.

Because the sensor outputs vary with temperature the null voltage is remeasured (updated) for all of the sensors after each time that a magnet is traversed. This reduces errors that otherwise might result from differences in temperature along a vehicle's path.

A simplified description of the program of FIG. 7 starts at a flow line 120. In block 122 the null voltages of the sensors 37–60 are measured. To do this the microprocessor 82 of FIGS. 6 A–D address the first sensor by way of multiplexers 70, 71. The signal from the first sensor passes across line 72 to the difference amplifier 94 and the A/D converter 78, thence to the microprocessor 82, FIGS. 6 A-D, where it is temporarily stored.

Returning to FIG. 7, in block 122 the multiplexers 70, 71 then measure the null voltage of the second sensor, etc. until all sensors have been measured. The entire sequence is then repeated several times in block 122, starting again with the first sensor. In block 124 all of the null readings of the first sensor are averaged and in block 126 the average value of null readings of the first sensor is stored. This averaging and storing process is performed for all twenty-four of the sensors.

Detection of a Magnet

After the null voltages have been stored the program goes into a wait loop 128. In the wait loop the microprocessor 82 continuously polls each sensor 37–60 to determine whether or not a signal level in excess of a predetermined threshold level exists, which would indicate the presence of a magnet nearby.

Details of the wait-loop are as follows. Block 130 shows the polling of sensor signals. In Block 132 the previously stored null voltage corresponding to each sensor is subtracted from the signal output of that sensor to obtain a difference signal, representing the strength of a magnetic field. In the block 134 the difference signal is tested to ascertain whether or not it exceeds a predetermined threshold level, which is set so as to differentiate between noise and true magnetic marker signals. If the difference signal is below the threshold level the wait-loop routine is repeated.

In another preferred embodiment, the program flow of which is seen in FIG. 8, the averaging and storing process is continued through a wait loop 128'. In this embodiment, a running average of each null voltage is calculated in block 150 by the following equation:

$$N_j(t) = (K_1 \cdot N_j(t-1) + r_j(t))/(K_1 + 1)$$

where:
- j represents the figure number of a selected sensor (i.e. j=37 thru 60).
- t is the time of the current sample.
- t−1 is the time of the previous sample.
- $N_j(t)$ is the average measurement of each null voltage at time t for sensor j.
- $K_1$ is an integer multiplier which determines the time or sample by sample weighting of past and present measurements on the current running average voltage calculation. ($K_1$ may be on the order of 100.)
- $N_j(t-1)$ is the average measurement of each null voltage at the previous sample or time t−1 for sensor j.
- $r_j(t)$ is the raw voltage measurement of the voltage at time t for sensor j.

When a difference signal is found to exceed the predetermined threshold level, the null voltage calculation is terminated. All other program functions in wait-loop 128' are the same as those of wait-loop 128.

Selection of a Group of Sensors

If the difference signal is large enough, block 136 stores the difference signal. It then finds the sensor having the greatest such difference signal and the sensor having the second greatest. The program of microprocessor 82 identifies the two closest sensors on the left side of the sensor that has the greatest difference signal, and the two closest sensors on the right side of the sensor that have the greatest difference signal, in block 138. Thus a group of five sensors is defined. The program then refers in block 140 to a lookup table that is stored in its memory to determine the distance to the magnet from each sensor, based on the magnitude of the signal received from the sensor.

Two tables, as shown by example below, relate the voltage measured by each sensor (37–60) to the absolute distance to the center of magnet 6. Table 1 is a lookup table comprising voltages measured at incremental distances by a sensor (37–60) from a magnet 6. Table 2 is a table providing the actual distances from the sensor to the center of the magnetic field as derived from currently used sensors (37–60) and magnet field strength.

| Relative Memory Location | Table 1 (Measured Voltage) | Table 2 (Radial Distance) |
|---|---|---|
| 0 | 142 raw ADC units | 0.0 inches |
| 1 | 139 | 0.0941 |
| 2 | 133 | 0.1882 |
| 3 | 124 | 0.2823 |
| 4 | 112 | 0.3764 |
| 5 | 99 | 0.4705 |
| 6 | 85 | 0.5646 |
| 7 | 71 | 0.6587 |
| 8 | 58 raw ADC units | 0.7528 inches |
| 9 | 46 | 0.8469 |
| 10 | 37 | 0.9410 |
| 11 | 29 | 1.0351 |
| 12 | 23 | 1.1292 |
| 13 | 17 | 1.2233 |
| 14 | 13 | 1.3174 |
| 15 | 9 | 1.4115 |

-continued

| Relative Memory Location | Table 1 (Measured Voltage) | Table 2 (Radial Distance) |
|---|---|---|
| 16 | 7 | 1.5056 |
| 17 | 4 | 1.5997 |
| 18 | 3 | 1.6938 |
| 19 | 2 | 1.7879 |

The step of looking up the distance from the sensor to the magnet is performed by the microprocessor 82, and is represented by the block 140 of FIGS. 7 and 8. The five selected sensors are denoted by $S_i$ (where $i = -2$ to 2) and the center sensor or sensor having the greatest measured voltage is $S_0$. Before a search is made to correlate each measured voltage with the related distance to the center of magnetic flux, the stored null voltage, $N_j$, is subtracted from the currently derived raw signal from each sensor (37–60) to provide a search variable, $E_i$, devoid of the null offset error as shown in the following equation:

$$E_i = S_0 - N_j$$

A sequential search through Table 1 is performed for each search variable $E_i$ each time the group of five sensors is sampled. To determine the distance from each selected sensor ($S_{-2,-1,0,1,2}$) to the center of magnetic flux, the table is searched until the difference between the value in Table 1 and the search variable changes sign. When the sign change occurs, the search variable is determined to be between the last and next-to-last Table 1 value used. An interpolation variable, I, is next calculated as follows:

$$I = (E_i - T_k)/(T_{k-1} - T_k)$$

where the previously undefined variables are:
  k is the relative memory position of the last Table 1 value used.
  $T_k$ represents the Table 1 value at relative memory position k.
  $T_{k-1}$ represents the Table 1 value at relative memory position k−1.
also:
  R represents a radial distance measurement of Table 2.
  $R_k$ represents the Table 2 value at relative memory position k.
  $R_{k-1}$ represents the Table 2 value at relative memory position at k−1.

The radial distance, $D_i$, from each sensor to the center of flux of magnet 6 is then calculated as:

$$D_i = I*(R_{k-1} - R_k) + R_{k-1}.$$

To calculate the position of the center of flux of magnet 6 from a common fixed point, such as array end 160, on the array 24, each $D_i$ is treated as a lateral vector, the sign of which is determined by its position relative to sensors having the greatest and second greatest difference signals as herebefore related. The position of the center of flux of magnet 6 from the common fixed point 160 is then calculated by adding or subtracting each $D_i$ depending upon the sign of the vector to or from linear distance $L_i$ of each sensor from array end 160 as shown in the following equation:

$$P_i = L_i +/- D_i.$$

A further correction may be made to relate the center of flux of magnet 6 to the centerline 164 of vehicle 2 by adding a constant which represents the distance from fixed point 160 on array 24 to centerline 164 of vehicle 2. See FIG. 3.

Average Lateral Position

In block 144 an average is taken of the five estimates of the location 145 of the magnet with respect to the centerline 59 of the vehicle. One estimate is available from each of the five sensors of the group (having asterisks in FIG. 3) whose middle one is the sensor of strongest signal.

In this example, sensor 45 is $S_0$, sensor 43 is $S_2$, sensor 44 is $S_1$, sensor 46 is $S_1$, and sensor 47 is $S_2$.

After each of the five sensors have been sampled, an average estimate of the position, $X_1$, of the center of flux of magnet 6 is calculated as shown below:

$$X_1 = (P_{-2} + P_{-1} + P_0 + P_1 + P_2)/5 + C$$

where
  C is the distance 162 from the distance from fixed point 160 on array 24 to the centerline 164 of vehicle 2.

The accuracy of measurement is further ameliorated by a running average of the successively measured values of $X_1$. Though other equations may be used to calculate the running average, the following equation is employed in the currently preferred embodiment:

$$X(t) = (K_2*X(t-1) + X(t))/(K_2 + 1)$$

where
  X(t) is the running average of the measurement of the center of flux of magnet 6 for the series of five sensors measured at time t and related to the centerline 164 of vehicle 2.
  X(t−1) is the previous running average of the measurement of the center of flux of magnet 6 for the series of five sensors measured at time t−1 and related to the centerline 164 of vehicle 2.
  $K_2$ is the filter or decay constant for the running average. $K_2$ is on the order of three in the currently preferred embodiment.

As one familiar with computer addressing would know, the values of measured voltages for Table 1 need not be derived from incremental distances, but only from measurements taken at known, regularly increasing or decreasing distances which are then stored in the related memory location in Table 2. New and useful Tables 1 and 2 may be generated for combinations of sensors and magnets which yield different voltage versus distance values by measuring the voltage as a function of distance for the new combination. As seen in Table 2, in the above example, the radial distances stored in incremental memory locations are even multiples of 0.0941 inches.

Time of Peak Sensor Signals

The next program function, performed in block 142, is to determine whether or not the peak of sensor voltage has been passed. The peak values of output voltage from the Hall sensors of array 24 occur when the array 24 is directly over the floormounted magnet 6. When the reading of the sensors start to decline the array of sensors has passed over the center of flux of magnet 6.

This condition is detected by block 142 by conventional programming.

Improved Accuracy of the Measurement

The combination of precalibrating each sensor prior to measurement to take out the offsetting null voltage and averaging and calculating a running average until the peak voltage is reached provides a measurement of significantly improved accuracy. The accuracy of the lateral position measurement 145 is 0.02 inch.

Output

The process of selecting a group of sensors, looking up distances and averaging them is a form of cross-correlation of received signals with a store field pattern. This result is transmitted, block 146, from the microprocessor 82 to a main microprocessor, not shown. It is transmitted promptly when the peak readings are detected, so the time of transmission of the data serves as an indication of the time at which the sensor array 24 crosses the marker magnet 6. In this way both lateral and longitudinal position information are obtained from one passage of the array 24 over magnet 6.

Data from block 146 is transmitted to the main microprocessor board. The program, at point 148, then returns to the starting program flow line 120 of FIGS. 7 and 8.

Another embodiment having two arrays of sensors such as array 24 is also feasible.

Figure 11:
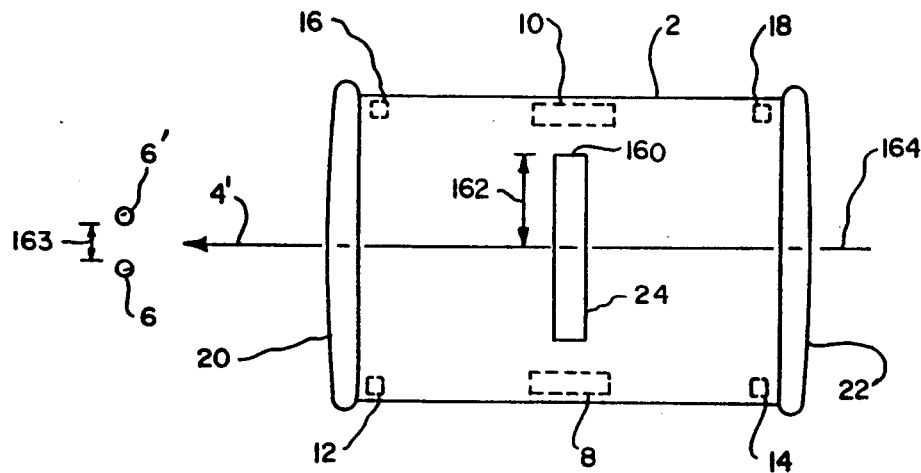
FIG. 11 is similar to FIG. 1, depicting a guided vehicle system that utilizes the invention and showing the presence of two magnets on the path ahead of the vehicle.
Figure 10:
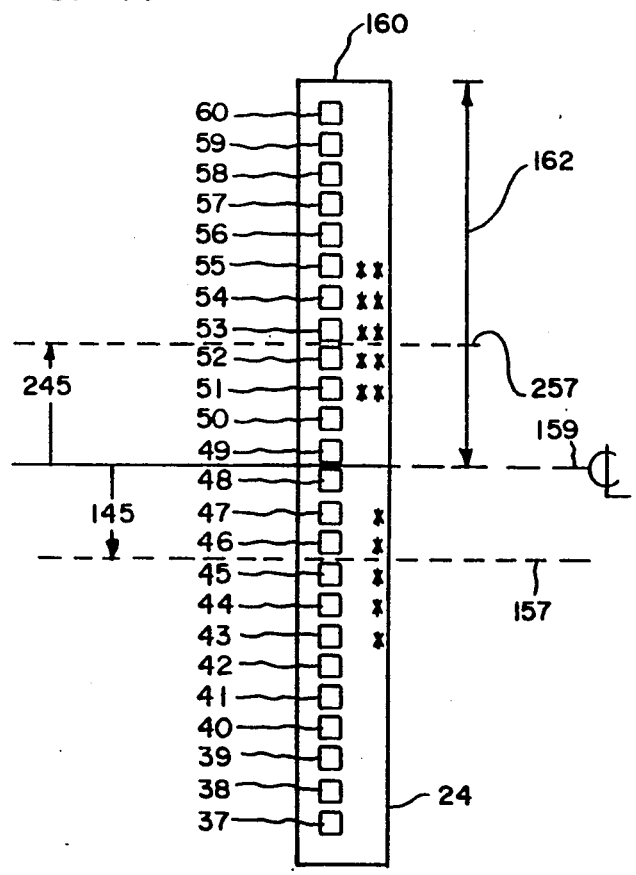
FIG. 10 is similar to FIG. 3, showing an array of Hall magnetic sensors on the vehicle, and including indicia exemplary of the presence of two magnets.

Reference is now made to FIGS. 9-11, wherein a second preferred embodiment is seen. In the second embodiment, two magnets 6, 6' are placed in sufficiently close proximity that magnetic flux from each of magnets 6, 6' is sensed by a plurality of sensors 37-60 concurrently, yet separation 163 of magnets 6, 6' is sufficient to permit independent processing of signals derived from each magnet 6 or 6'.

As seen in FIG. 10, exemplary path 157 of the center of flux of one magnet 6 is the same as the path described in FIG. 3. A second path 257 is seen for second magnet 6'. The table below summarizes the results of signals derived from two concurrently measured magnetic paths 157, 257, showing the assumed greatest signal level sensed for each magnet, next highest level and sensors active for the measurement of position of each magnet (indicated by a single asterisk (*) for magnet 6 and a double asterisk (**) for magnet 6'):

| Relative sensor Position | First magnet (6) Number | Second Magnet (6') Number |
|---|---|---|
| S-2 | 43 | 51 |
| S-1 | 44 | 52* |
| S0 | 45 | 53 |
| S1 | 46* | 54 |
| S2 | 47 | 55 |

*indicates the sensor adjacent to the sensor having the greatest signal magnitude and having the second greatest signal magnitude thereby providing an indication the center of magnetic flux lies therebetween.

Figure 9A:
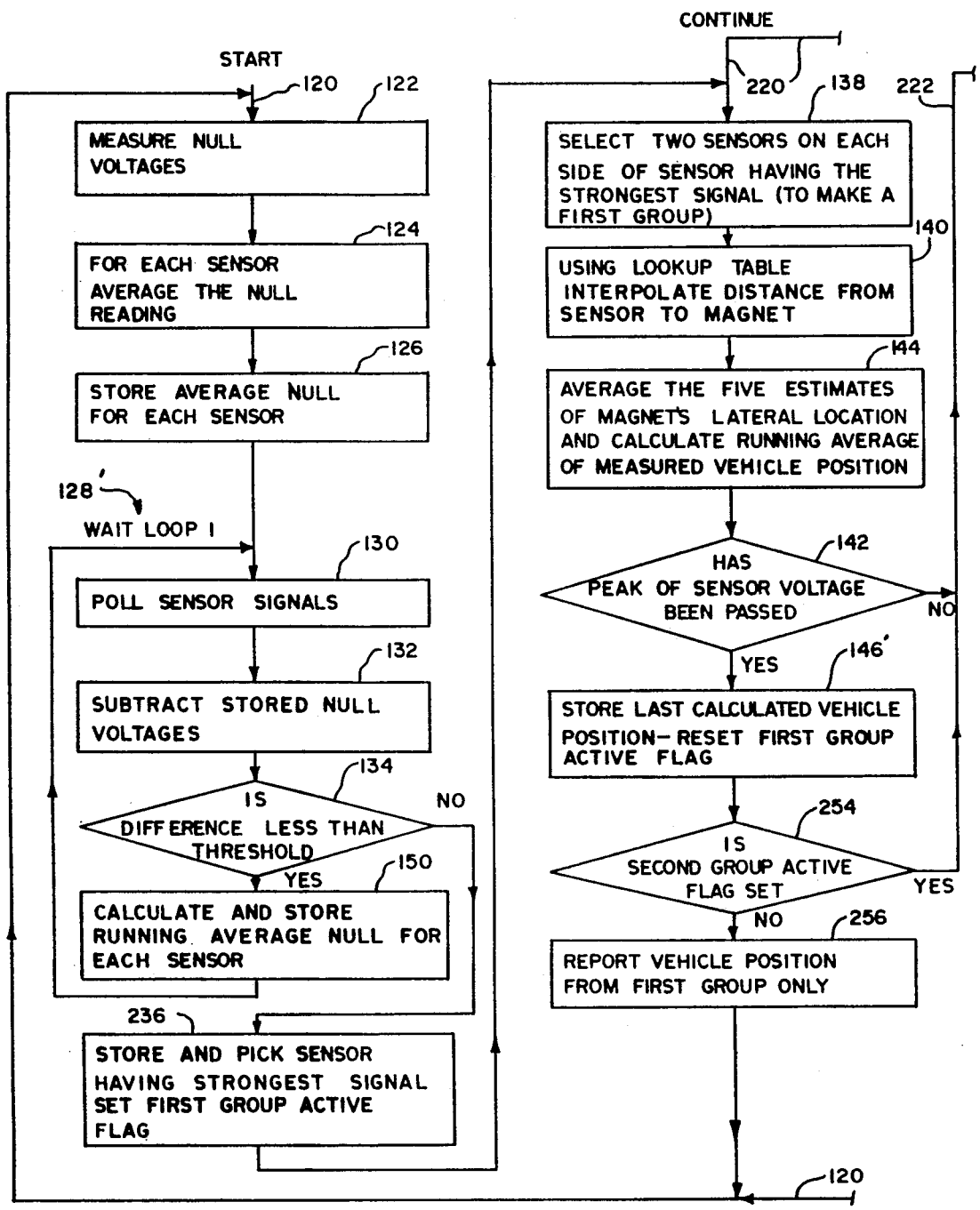
Figure 9:
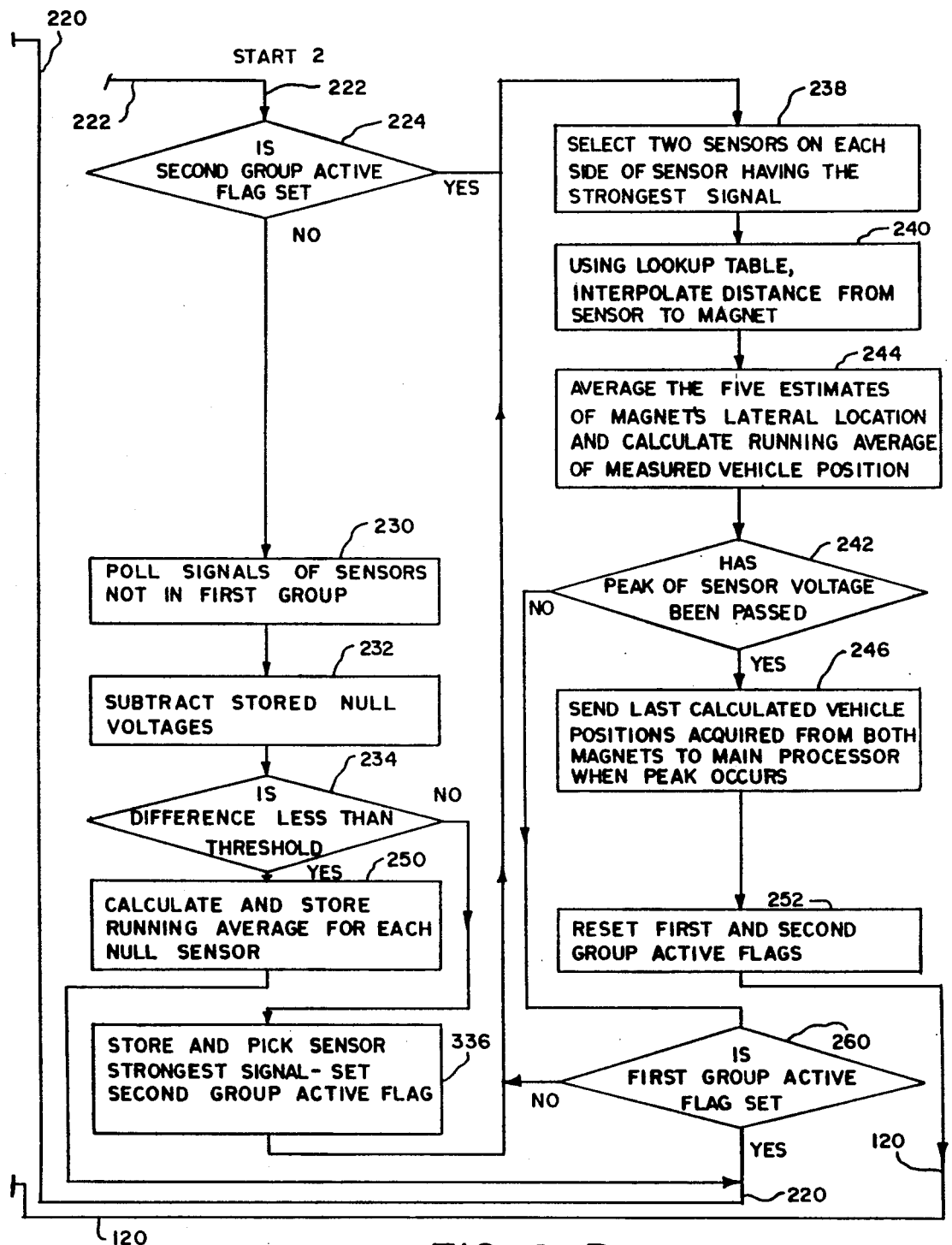

FIGS. 9 and 9A-B show a simplified flow chart of the logical and calculational steps for determining the position of the vehicle relative to each magnet 6, 6'. FIG. 9 shows the orientation of FIG. 9A relative to FIG. 9B. Program flow line 120 connects the output of block 252 in FIG. 9B to START in FIG. 9A. Program flow line 220 connects the "yes" output of block 260 in FIG. 9B to CONTINUE in FIG. 9A. Program flow line 222 connects the "yes" output of block 254 and the "no" output of block 142 of FIG. 9A to START 2 in FIG. 9B.

As before described, the null offsets are calculated during a known null period as specified in blocks 122, 124, and 126. As earlier described, in FIG. 8, a WAIT LOOP 128' provides an updating of the null calibration for each of the sensors until an over threshold measurement indicates detection of magnetic flux of a first magnet 6 or 6'. Upon such detection as part of block 236 activity, the sensor values are stored and the sensor having the strongest signal is selected as earlier described for block 136 in FIG. 7. In addition in block 236, a first sensor group active flag is set to signal a first magnet position measurement is active.

As earlier described, the activities of blocks 138, 140, and 144 select the group of sensors used in the calculation of what is now the first sensor group, interpolate the distance from each sensor of the first group to the center of magnetic flux of the first detected magnet and average, then calculate a running average of the position of the vehicle relative to the magnet. Decision block 142 branches to a block 146' when the peak value of the first sensed signal is detected or to a second path headed by START 2 before the peak is discovered.

At START 2, input program flow line 222 leads to decision block 224 wherein a decision is made whether or not a second group active flag is set indicating a signal has previously been detected from a second magnet. If the second group flag is not set, a single pass through blocks 230, 232, and 234 is made. Blocks 230, 232, and 234 comprise programming functions which are similar to those described for blocks 130, 132, and 134, except blocks 230, 232, and 234 only process information related to sensors of array 24 not involved with the first group. If no threshold is detected in block 234, an updated null calibration is calculated for each sensor which is not part of the first group and a branch is made TO CONTINUE to merge with program flow line 220. If a signal above threshold is detected, a branch is made to block 336 wherein the appropriate signal values are stored and processed as in block 136 for a second group of sensors and the second group active flag is set.

The program proceeds directly from block 336 to block 238. If the second group active flag is set upon entry at program flow line 222, a branch is made directly to block 238 therefrom.

Sequentially, blocks 238, 240, and 244 perform the same functions upon data received from sensors of the second group as blocks 138, 140, and 144 perform upon data received from sensors of the first group. Decision block 242 determines whether or not a signal peak, as before described, has been reached. If not, the process continues to decision block 260. If so, measured position values, as derived from both magnets 6 and 6', are transmitted to the main processor for use in navigation and guidance updating, the first and second group active flags are reset as shown in block 252. From block 252, the logic path proceeds to START at program flow line 120 to repeat the function preliminary to the search for one or more additional magnets along the vehicle's path.

From decision block 260, a branch is made to block 238 if the first group active flag is reset indicating a peak has been detected for the first measured magnetic field. If the first group active flag is set, the program proceeds to program flow line 220 whereat block 138 is entered to subsequently process the output of the first group of sensors dedicated to making a measurement of the position of the first detected magnetic field.

If within block 142 a peak voltage is detected, the programs proceeds to block 146' wherein the measured position determined by first group measurements are stored for later recovery and transmission to the main processor and the first group active flag is reset. From block 16', decision block 254 is entered, wherein a branch is made to proceed TO START 2 through program flow line 222 if the second group active flag is set or to proceed to block 256 if the second group active flag is reset. At block 256, only the first group measured position is reported based upon only one magnetic field having been detected and no concurrent measurement having been made.

Although the invention has been illustrated by describing only one particular preferred embodiment, its scope is not limited to that embodiment, but rather is determined by the claims.

We claim:

1. Apparatus for improved accuracy for ascertaining an estimate of a lateral position of an automatically guided vehicle at a predetermined area on a route of the vehicle comprising:
   a stationary magnet mounted in predetermined orientation on the route to provide a sensible unipolar magnetic field that diminishes with increasing distance from the center of the magnetic field;
   sensor means comprising a plurality of magnetic-field sensors on the vehicle in a linear array and means for calibrating said sensors to null each sensor offset before the vehicle passes near the magnet, each of said sensors in combination with said calibrating means producing a search variable representing sensed magnetic field strength;
   means for pre-storing a plurality of predetermined patterns of magnetic field strength as a function of distance from the center of a magnetic field to a precalibrated sensor on the vehicle;
   interpolation means for receiving and processing said search variables, including means for computing a mean estimated lateral position of said magnetic field center relative to said vehicle based upon interpolation of each value of each search variable within said stored predetermined pattern;
   means for communicating said estimated lateral position for use by said automatically guided vehicle.

2. Apparatus as in claim 1 and wherein
   said means for pre-storing a predetermined pattern of magnetic field strength as a function of distance from the magnet comprises memory means for storing a lookup table; and
   said means for computing comprises:
      means for identifying a sensor group comprising a sensor having the largest search variable and a sensor having the next-largest search variable adjacent the sensor having the largest search variable;
      program means for providing a measurement of distance between the magnet and each sensor of said group;
      means for receiving said measurement of distance for computing an estimated lateral position of said magnet relative to said vehicle based upon a composite of said distances.

3. Apparatus as in claim 2 and wherein
   said distance measurement receiving means comprise means for computing an estimated lateral position of said magnet relative to said vehicle by averaging the measurements of lateral position derived from each sensor of said group.

4. Apparatus as in claim 3 and wherein
   said means for computing the lateral position of said magnet relative to said vehicle further comprise means for calculating a running average of a plurality of computations of the estimated lateral position of said magnet relative to said vehicle whereby the estimate of lateral position of said magnet to said vehicle is improved.

5. Apparatus for improved accuracy for ascertaining an estimate of a lateral position of an automatically guided vehicle at a predetermined area on a route of the vehicle comprising:
   a stationary magnet mounted on the route to provide a sensible unipolar magnetic field that diminishes with increasing distance from the center of the magnetic field;
   a plurality of magnetic-field sensors on the vehicle in an array, each sensor producing an electrical signal comprising a magnitude which decreases as distance between the sensor and the center of the magnetic field increases;
   means for receiving and processing said signals comprising means for precalibrating each sensor signal as the vehicle travels between magnets and means for identifying a sensor group comprising a sensor having the greatest calibrated signal strength and a sensor having the next-greatest calibrated signal strength on a side adjacent to the sensor having the greatest calibrated signal strength;
   program means for providing a plurality of measurements comprising each distance between the center of the magnetic field and each sensor of said group, based on the calibrated signal strength of each sensor;
   means for receiving said measurements of distance and for computing an estimated lateral position of said magnetic field center relative to said vehicle based upon a composite of said measurements;
   means for communicating said estimated lateral position for use by said automatically guided vehicle.

6. Apparatus as in claim 5 and wherein
   said receiving and computing means further comprise means for calculating a running average from a plurality of computations of estimated lateral position of said magnet relative to said vehicle whereby the running average estimate of the estimated lateral position of said magnet to said vehicle is improved relative to the measurement of each single computation of estimated lateral position.

7. Apparatus for improved accuracy for ascertaining an estimate of a lateral position and a time of arrival of an automatically guided vehicle at a predetermined area on a route of the vehicle comprising:
   a stationary magnet mounted on the route to provide a sensible unipolar magnetic field that diminishes with increasing distance from the center of the magnetic field;
   sensor means comprising a plurality of magnetic-field sensors on the vehicle in a sensor array and means for calibrating each sensor as the vehicle travels between magnets, each sensor in combination with said calibrating means producing a search variable having a magnitude dependent upon distance between the sensor and the center of the magnetic field;

means for receiving and processing said search variables, including means for identifying a group comprising a sensor having the greatest search variable magnitude and a sensor adjacent the sensor having the greatest search variable magnitude having the next-greatest search variable magnitude;

program means for calculating a measurement of distance between the center of the magnetic field and a reference position on the vehicle;

means receiving each said measurement of distance for computing an estimated lateral position of said magnet relative to said reference position on said vehicle based upon a composite comprising a running average of each of distance measurements;

means for repeatedly receiving and for processing said search variables as the sensor array approaches and passes over said magnet, including second program means for discerning when the magnitudes of the search variables start to diminish after rising to a peak;

means for terminating said computing means when said discerning means detect a peak value of said search variables whereat said running average is said estimated lateral position;

means for outputting said estimated lateral position when the signals have risen to said peak as the array passes over the magnet whereby information as to estimated lateral position and time of arrival at said magnet is provided, for use by said automatically guided vehicle.

8. Apparatus for ascertaining an estimated lateral position of an automatically guided vehicle at a predetermined area on a route of the vehicle with improved accuracy, said apparatus comprising:

(a) a stationary magnet mounted on the route to provide a sensible unipolar magnetic field that diminishes with increasing distance from the center of said field;

(b) means for pre-storing a predetermined pattern of magnetic field strength as a function of distance from the center of the magnetic field;

(c) sensor means comprising an array of magnetic-field sensors transversely disposed to direction of vehicle travel and means for calibrating said sensors as the vehicle travels between sensible magnetic fields, each sensor in combination with said calibrating means producing a search variable calibrated to precisely represent magnetic field strength;

(d) correlation means for receiving and for processing said search variables, including means for computing an estimated lateral position of said magnet relative to said vehicle based upon interpolation involving said search variables and said stored predetermined pattern.

9. Apparatus as in claim 8 and wherein said means for pre-storing a predetermined pattern of magnetic field strength as a function of distance from the center of the magnetic field comprises a computer memory for storing a lookup table.

10. Apparatus as in claim 8 and wherein
said means for pre-storing a predetermined pattern of magnetic field strength as a function of distance from the center of the magnetic field comprises memory means for storing a lookup table;
said means for computing the estimated lateral position of said magnet relative to said vehicle based upon correlation between said search variables and said stored predetermined pattern comprise:
means for identifying within the array a sensor group comprising a sensor having the largest search variable and a sensor adjacent the sensor having the largest search variable having the next-largest search variable;
program means for providing a measurement of distance between the center of the magnetic field and each sensor of said group, based upon the magnitude of the search variable of each sensor;
means receiving said measurements of distance for computing an estimated lateral position of said magnetic field center relative to said vehicle based upon a respective composite of said measurements.

11. Apparatus as in claim 10 and wherein
said means receiving said measurements of distance for computing the estimated lateral positions of said magnet relative to said vehicle comprise means for computing the said estimated lateral positions by at least one means for averaging the measurements of lateral position derived from each sensor of said group, for the array of sensors.

12. Apparatus for improved accuracy for ascertaining an estimated lateral position and bearing of an automatically guided vehicle at a predetermined area on a route of the vehicle comprising:
at least two stationary magnets mounted in predetermined orientation to the route to provide a plurality of separably sensible unipolar magnetic fields, each magnetic field decreasing in strength as distance increases from the center of said magnetic field;
sensor means comprising a plurality of magnetic-field sensors on the vehicle in an array transversely disposed to direction of travel of the vehicle and means for calibrating to null each sensor offset as the vehicle passes between magnets, each sensor in combination with said calibrating means producing a search variable representing measured magnetic field strength;
means for pre-storing a plurality of predetermined unipolar patterns of magnetic field strength as a function of distance from the center of the magnetic field to a sensor on the vehicle;
interpolation means for receiving and for processing said search variables, including means for computing a mean estimated lateral position of each of said centers of magnetic fields relative to a fixed site on said vehicle based upon interpolation of said stored predetermined pattern relative to each search variable;
means for communicating said estimated lateral positions for use by said automatically guided vehicle wherein vehicle bearing is calculated from said plurality of positions.

13. Apparatus for concurrently ascertaining an estimated lateral position of at least two magnets relative to a vehicle with improved accuracy, said apparatus comprising:
at least two stationary magnets mounted in predetermined orientation to a predetermined vehicle route to provide a plurality of separably sensible unipolar magnetic fields;
sensor means comprising a plurality of magnetic-field sensors on the vehicle in an array disposed transverse to direction of vehicle travel and means for calibrating to null each sensor offset before each sensor passes sensibly near a magnet, each of said sensors in combination with the calibrating means producing a search variable representing measured magnetic field strength of each magnet;

means for pre-storing a plurality of predetermined patterns of magnetic field strength as a function of distance from the center of a sensed magnetic field to a precalibrated sensor on the vehicle;

interpolation means for receiving and processing said search variables, including means for computing a mean estimated lateral position of each of said centers of magnetic fields relative to said vehicle based upon interpolation of each search variable within a pattern of magnetic field strength selected from said stored predetermined patterns;

means for identifying a first sensor group comprising a sensor having the largest search variable and a sensor, adjacent the sensor having the largest search variable, having the next-largest search variable for a first sensed magnet;

means for identifying a second sensor group comprising a sensor having the largest search variable and a sensor, adjacent the sensor having the largest search variable, having the next-largest search variable for a second sensed magnet;

program means for providing a measurement of distance between the center of the magnetic field of the first magnet and each sensor of said first group based upon the search variable of each precalibrated sensor of said first group;

program means for providing a measurement of distance between the center of the magnetic field of the second magnet and each sensor of said second group based upon the search variable of each precalibrated sensor of said second group;

means receiving all of said measurements of distance for computing the estimated lateral position of the center each said magnetic field relative to said vehicle based upon a composite of said distances.

14. A method for concurrently ascertaining, with improved accuracy, an estimated position of a magnet relative to a vehicle, comprising the following steps:

(a) providing a stationary magnet mounted in predetermined orientation to a preselected vehicle route to provide a separably sensible unipolar magnetic field;

(b) providing an array of magnetic-field sensors on the vehicle, the array of sensors being transversely disposed to direction of travel of the vehicle;

(c) providing a means for programmably interpolating and storing position related data;

(d) calibrating measurement outputs of said sensors to null sensor offset before the vehicle passes sensibly near each magnetic field thereby calculating a search variable for each measurement output;

(e) sensing presence of the magnetic field emanating from said magnet to end the calibrating step and begin an interpolation process;

(f) as a part of the interpolation process, identifying by search variable magnitude, a separate sensor group which centrally comprises a sensor having the largest search variable;

(g) interpolating to calculate an estimated lateral position of the center of the magnetic field relative to each sensor;

(h) averaging calculated positions as derived from each sensor search variable relative to a position on the sensor array and therefrom to the vehicle whereby an estimate of vehicle position relative to said magnet is determined;

(i) determining whether measurements of search variables have reached a peak, if not, continue by proceeding to step (f), otherwise continue by proceeding to step (j);

(j) terminating the interpolation process immediately after a peak of the magnetic field is detected, whereby said estimate is a final estimated position of the magnet relative to the vehicle.

15. A method for concurrently ascertaining an estimated position of each of at least two magnets relative to a vehicle with improved accuracy, comprising the following steps:

providing at least two stationary magnets mounted in predetermined orientation transversely disposed to direction of travel along a predetermined vehicle route to provide a plurality of separably sensible unipolar magnetic fields;

providing an array of magnetic-field sensors on the vehicle, said array being transversely disposed to directions of vehicle travel;

providing a means for programmably interpolating and storing position related data;

calibrating said sensors to null sensor offset before the vehicle passes sensibly near a magnet;

sensing presence of the magnetic field emanating from at least one of said magnets to begin an interpolation process;

setting a first group active flag;

identifying by signal strength, a first sensor group for the magnet concurrently sensed, the first group centrally comprising a sensor having the greatest calibrated signal;

cyclicly, interpolating to calculate an estimated lateral position of the magnet sensed by the first group relative to each sensor selected for use in the first sensor group and averaging calculated positions as derived from each first group sensor relative to a position on the sensor array and therefrom to the vehicle whereby a first measured vehicle position relative to the first magnet is determined;

terminating the interpolation steps for the first magnet immediately after a peak of the magnetic field of the first magnet is detected;

sensing presence of a second magnetic field emanating from a second magnet;

setting a second group active flag;

identifying by signal strength, a second sensor group for the second magnet, the second group centrally comprising a sensor having the greatest signal;

cyclicly, interpolating to calculate the estimated lateral position of the magnet sensed by the second group relative to each sensor selected for use in the second sensor group and averaging calculated positions as derived from each second sensor group relative to the position on the sensor array and therefrom to the vehicle whereby a second measured vehicle position relative to the second magnet is determined;

terminating the interpolation steps for the second magnet immediately after a peak of the magnetic field of the second magnet is detected;

upon terminating each interpolation, resetting each respective group active flag whereafter a final first and a second measured vehicle position is determined relative to each magnet.

* * * * *